(12) United States Patent
Haugen et al.

(10) Patent No.: US 11,221,308 B2
(45) Date of Patent: Jan. 11, 2022

(54) INTELLIGENT ROAD POTHOLE DETECTION

(71) Applicant: TOYOTA MOTOR ENGINEERING & MANUFACTURING NORTH AMERICA, INC., Plano, TX (US)

(72) Inventors: Brian J. Haugen, Saline, MI (US); Ryan M. Wiesenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/735,246

(22) Filed: Jan. 6, 2020

(65) Prior Publication Data

US 2021/0208093 A1 Jul. 8, 2021

(51) Int. Cl.
*G08B 21/18* (2006.01)
*G01N 27/20* (2006.01)
(Continued)

(52) U.S. Cl.
CPC ........... *G01N 27/20* (2013.01); *G01N 27/041* (2013.01); *G08B 21/185* (2013.01); *E01C 11/00* (2013.01)

(58) Field of Classification Search
CPC .... G01N 27/20; G01N 27/041; G08B 21/185; E01C 11/00
See application file for complete search history.

(56) References Cited

U.S. PATENT DOCUMENTS

| 5,403,550 A | * | 4/1995 | Wietek | G01N 17/02 204/404 |
| 5,895,843 A | * | 4/1999 | Taylor | H01C 10/46 324/700 |

(Continued)

FOREIGN PATENT DOCUMENTS

| DE | 4029615 C2 | 4/1994 |
| JP | 2005353015 A | 12/2005 |

(Continued)

OTHER PUBLICATIONS

Osborne, Charlie, "Self-powered road sensors detect potholes before they burst your tires," https://www.zdnet.com/article/road-sensors-to-detect-potholes-before-they-bust-your-tires/, Published/Accessed: Apr. 4, 2018.

(Continued)

*Primary Examiner* — Nay Tun
(74) *Attorney, Agent, or Firm* — Dinsmore & Shohl, LLP (57) ABSTRACT

A system includes a conductive material configured along a segment of a road, a signal generator electrically coupled to the conductive material, where the signal generator is configured to generate an electrical signal for transmission across the conductive material, and an electronic control unit communicatively coupled to the signal generator and the conductive material. The electronic control unit is configured to determine whether the electrical signal from the signal generator is propagating through the conductive material, and in response to determining that the electrical signal does not propagate through the conductive material, determine that a pothole is present at a location along the segment of the road comprising the conductive material.

16 Claims, 4 Drawing Sheets

(51) Int. Cl.
*G01N 27/04* (2006.01)
*E01C 11/00* (2006.01)

(56) References Cited

U.S. PATENT DOCUMENTS

| | | | | |
|---|---|---|---|---|
| 6,012,337 | A * | 1/2000 | Hodge | G01B 11/16 |
| | | | | 324/700 |
| 6,181,841 | B1 * | 1/2001 | Hodge | G01B 11/16 |
| | | | | 385/12 |
| 6,487,914 | B1 * | 12/2002 | Hodge | G01B 11/16 |
| | | | | 73/800 |
| 6,647,161 | B1 * | 11/2003 | Hodge | G01B 11/16 |
| | | | | 385/12 |
| 7,034,660 | B2 * | 4/2006 | Watters | G01D 5/48 |
| | | | | 205/775.5 |
| 7,777,496 | B2 * | 8/2010 | Evans | G01N 21/84 |
| | | | | 324/534 |
| 7,921,727 | B2 * | 4/2011 | Rice | G01B 7/18 |
| | | | | 73/762 |
| 8,801,325 | B1 * | 8/2014 | Garland | E01C 7/187 |
| | | | | 404/77 |
| 9,724,877 | B2 * | 8/2017 | Flitsch | E01C 23/06 |
| 10,082,492 | B2 * | 9/2018 | Mazzeo | G01N 33/383 |
| 10,138,005 | B2 * | 11/2018 | Gibson | B64G 1/56 |
| 10,488,279 | B2 * | 11/2019 | Subramaniyan | G01L 1/20 |
| 2002/0154029 | A1 * | 10/2002 | Watters | G01M 5/0083 |
| | | | | 340/870.07 |
| 2005/0284232 | A1 * | 12/2005 | Rice | G01N 27/205 |
| | | | | 73/762 |
| 2010/0225497 | A1 * | 9/2010 | Marincak | G01N 27/24 |
| | | | | 340/657 |
| 2011/0291802 | A1 * | 12/2011 | Fay | G01M 5/0033 |
| | | | | 340/10.1 |
| 2013/0063282 | A1 * | 3/2013 | Baldwin | B61L 29/282 |
| | | | | 340/941 |
| 2013/0136539 | A1 * | 5/2013 | Aardema | G01K 1/14 |
| | | | | 404/75 |
| 2014/0374933 | A1 * | 12/2014 | Flitsch | B33Y 10/00 |
| | | | | 264/36.1 |
| 2015/0219576 | A1 * | 8/2015 | Rudahl | G01N 33/42 |
| | | | | 324/76.39 |
| 2015/0246614 | A1 * | 9/2015 | Dames | H05K 9/0075 |
| | | | | 191/10 |
| 2019/0041280 | A1 * | 2/2019 | Subramaniyan | F01D 5/284 |
| 2019/0073762 | A1 * | 3/2019 | Kean | G06T 7/62 |
| 2019/0137305 | A1 * | 5/2019 | Karabacak | E01F 11/00 |
| 2019/0265015 | A1 * | 8/2019 | Michiwaki | G01L 1/22 |
| 2020/0003588 | A1 * | 1/2020 | Huang | G01D 5/268 |
| 2020/0139976 | A1 * | 5/2020 | Magnusson | B60W 40/06 |

FOREIGN PATENT DOCUMENTS

| | | |
|---|---|---|
| JP | 2008058079 A | 3/2008 |
| WO | 2011046402 A2 | 4/2011 |

OTHER PUBLICATIONS

Madli, Rajeshwari; Hebbar, Santhoshs; Pattar, Praveenraj; Golla, Varaprasad; "Automatic Detection and Notification of Pothole and Humps on Roads to Aid Drivers," https://www.researchgate.net/publication/277658928_Automatic_Detection_and_Notification_of_Potholes_and_Humps_on_Roads_to_Aid_Drivers; Published/Accessed: Aug. 2015.

"Pothole detection technology research announced by Jaguar Land Rover;" https://www.landrover.com/experiences/news/pothole-detection.html; Published/Accessed: Jun. 5, 2019.

* cited by examiner

INTELLIGENT ROAD POTHOLE DETECTION

TECHNICAL FIELD

The present specification generally relates to systems and methods for detecting potholes in a road. More specifically, the present specification relates to systems and methods that employ conductive materials within or on the surface of the road, pass a signal through the conductive material, and monitor the response to determine whether a pothole within the road is present.

BACKGROUND

Potholes are irregularities in a road, such as holes that may form in a variety of manners, such as from the expansion and contraction of water within, under, and/or on top of the road. The expansion and contraction of water may cause the surface of the road to lose cohesion and eventually break apart. Potholes can vary in size, shape, and depth. When left unpatched, the size and depth of a pothole can increase from vehicles tires impacting the pothole. In addition to further deterioration of the roadway, potholes can cause significant damage to vehicles. For example, potholes can bend the wheels of a vehicle, damage tires, damage the vehicle suspension and/or alignment, and in some cases cause a driver to lose control of their vehicle as a result of an impact with a pothole.

Accordingly, there is a need for systems and methods for detecting potholes in a road so they may be repaired.

SUMMARY

In one embodiment, a system includes a conductive material configured along a segment of a road a signal generator electrically coupled to the conductive material, where the signal generator is configured to generate an electrical signal for transmission across the conductive material, and an electronic control unit communicatively coupled to the signal generator and the conductive material. The electronic control unit is configured to determine whether the electrical signal from the signal generator is propagating through the conductive material, and in response to determining that the electrical signal does not propagate through the conductive material, determine that a pothole is present at a location along the segment of the road comprising the conductive material.

In some embodiments, a method includes generating an electrical signal with a signal generator, transmitting the electrical signal to a conductive material configured along a segment of a road, determining, with an electronic control unit, whether the electrical signal from the signal generator is propagating through the conductive material, and in response to determining that the electrical signal does not propagate through the conductive material, determining that a pothole is present at a location along the segment of the road comprising the conductive material.

In some embodiments, a system includes a conductive material configured along a segment of a road, a signal generator electrically coupled to the conductive material, where the signal generator is configured to generate an electrical signal for transmission across the conductive material, and an electronic control unit communicatively coupled to the signal generator and the conductive material. The electronic control unit is configured to determine whether the electrical signal from the signal generator is propagating through the conductive material, in response to determining that the electrical signal does not propagate through the conductive material, determine that a pothole is present at a location along the segment of the road comprising the conductive material, in response to determining that the electrical signal is propagating through the conductive material, determine a characteristic of the electrical signal that propagated through the conductive material, compare the characteristic of the electrical signal that propagated through the conductive material with a corresponding characteristic of the electrical signal from the signal generator; and determine the presence of the pothole based on the comparison of the characteristic of the electrical signal that propagated through the conductive material and the corresponding characteristic of the electrical signal from the signal generator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein generally include technology that intelligently detects potholes in road surfaces utilizing sensing equipment installed in the road. The technology allows the road to detect defects such as potholes within itself and upload the information to a tracking system through which repairs may be coordinated. In some embodiments, the detection system may upload information regarding the road for use in roadway material and/or structure analysis.

More specifically, embodiments of the present disclosure include employing conductive materials within or on the surface of the road, passing a signal through the conductive material and monitoring the response to determine whether a pothole within the road is present. When a pothole is detected, the monitoring controller (e.g., an electronic control unit as will be described in more detail herein) may transmit information to a computing device that aggregates information from one or more detection systems. The computing device may be manned or automatically configured to generate work orders to facilitate repairs at specific locations along a stretch of road based on the information received from the detection system.

The present disclosure will now describe the pothole detection system and methods with reference to at least two non-limiting configurations where the conduction material may be deployed as wires or other conductive material within the surface course of the road and/or with conductive paint on the surface of the road. It is understood that the two configurations may be used independently or in combination with each other and/or with other configurations appreciated by those skilled in the art without deviating from the scope of the present application and claims.

The systems and methods for detecting potholes within a road will now be described in more detail with reference to the drawings and where like numbers refer to like structures.

Figure 1:
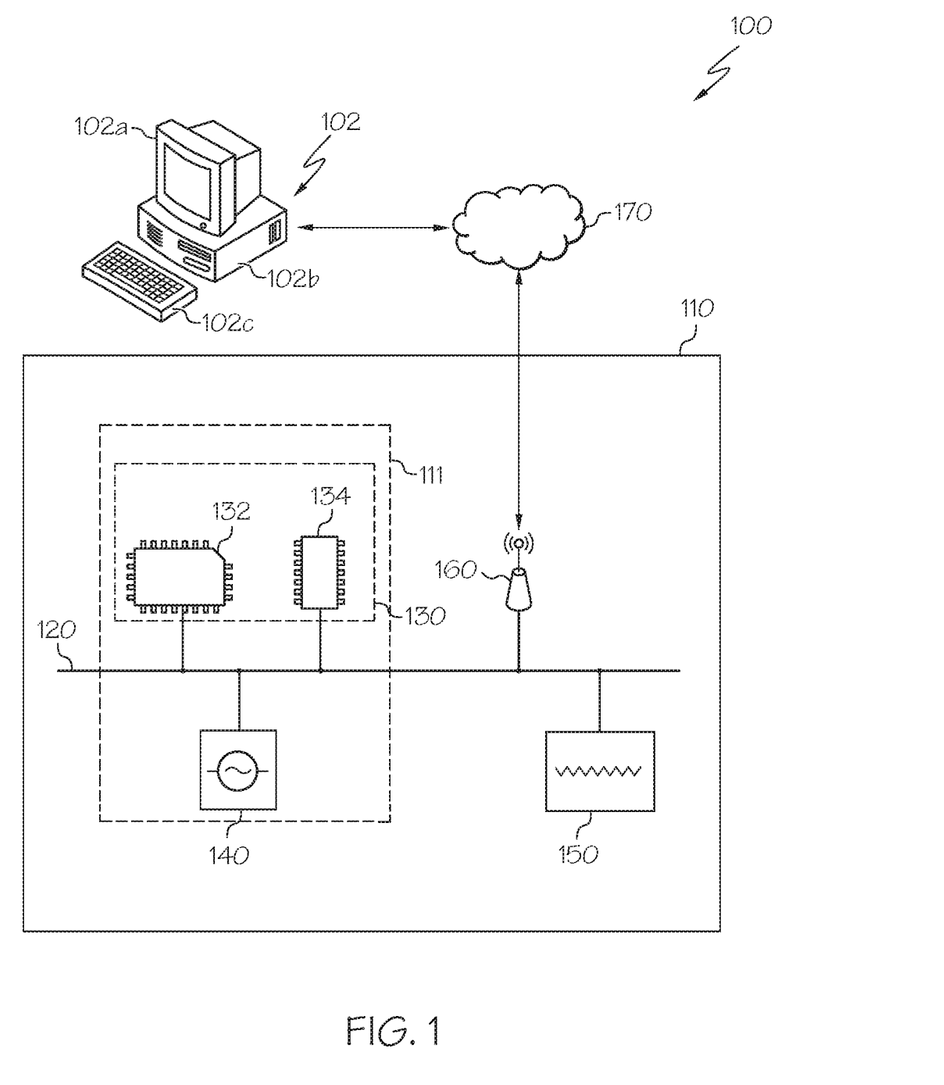
FIG. 1 schematically depicts components of a system for detecting a pothole in a road according to one or more embodiments shown and described herein.

FIG. 1 schematically depicts components of a system 100 for detecting a pothole in a road. The system 100 for detecting a pothole in a road includes a pothole detection system 110, a network 170, and one or more remote computing devices 102. The pothole detection system 110 includes a communication path 120, a detection subsystem 111 having an electronic control unit 130 having a processor 132 and a non-transitory computer readable memory 134, and a signal generator 140. The pothole detection system 110 further includes a conductive material 150 and network interface hardware 160. The pothole detection system 110 may be communicatively coupled to the network 170 by way of the network interface hardware 160. The various components of the system 100 and the interaction thereof will be described in detail below.

The network 170 may operate to connect the pothole detection system 110 with one or more remote computing devices 102. The remote computing device 102 may include a display 102a, a processing unit 102b and an input device 102c, each of which may be communicatively coupled to together and/or to the network 170. The remote computing device 102 may be utilized to configure the system 100. In some embodiments, the remote computing device 102 may receive notifications from the pothole detection system 110 and information relating to the same such that the remote computing device 102 may report the information to a user and/or automatically generate a work order for a road repair in response to receiving a notification indicating the presence of a pothole.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the pothole detection system 110. As used herein, the term "communicatively coupled" means that coupled components are capable of exchanging signals with one another such as, for example, electrical signals via conductive medium, electromagnetic signals via air, optical signals via optical waveguides, and the like.

The detection subsystem 111 may include the electronic control unit 130 and the signal generator 140. As described in more detail with reference to FIG. 2, a plurality of detection subsystems 111 may be deployed along segments of road for interfacing with and monitoring one or more conductive materials 150 installed with the road. It should be understood that while the detection subsystem 111 is described with reference to an electronic control unit 130 having a processor 132 and a non-transitory computer readable memory 134, the functionality of the electronic control unit 130 may be deployed as a circuit of discrete analog components.

The electronic control unit 130 may be any device or combination of components comprising a processor 132 and non-transitory computer readable memory 134. The processor 132 of the pothole detection system 110 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the pothole detection system 110 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the pothole detection system 110 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG.

1 includes a single non-transitory computer readable memory 134, other embodiments may include more than one memory module.

The signal generator 140 may be an alternating current (AC) power supply, a direct current (DC) power supply, a waveform generator, a battery, or any other device capable of generating an electrical signal. The signal generator 140 is configured to generate a unique predetermined electrical signal that is applied to the conductive material 150. The electrical signal generated by the signal generator 140 may have a predetermined voltage, frequency, period and the like defining a modulated signal. The signal generator 140 may be operatively controlled by the electronic control unit 130. The electronic control unit 130 may define the parameters of the electrical signal or modulated signal for generation by the signal generator 140.

Still referring to FIG. 1, the system 100 and more specifically the pothole detection system 110 includes a conductive material 150. The conductive material 150 may be a wire, a network of wires, a conductive paint, a resistive component such as a semi-conductor, a combination thereof, and/or another conductive material 150. The conductive material 150 may be any tangible medium capable of conducting an electrical signal over a distance or length. The conductive material 150 may be a conductive paint such as an MG Chemicals' conductive paint product. For example, but without limitation, the conductive paint may be MG Chemicals' 838AR—TOTAL GROUND™ carbon conductive paint, 841AR—SUPER SHIELD™ nickel conductive paint, 843AR—SUPER SHIELD™ silver coated copper conductive coating, or 842AR—SUPER SHIELD™ silver conductive coating. In some embodiments, the conductive material 150 may be one or more wires applied to the surface of the road or configured with the surface course of the road. The wires may serve additional purposes beyond pothole detection. For example, the wires may be configured as wireless power transmission coils for providing power to a vehicle or electronic device in the environment of the road.

Still referring to FIG. 1, the pothole detection system 110 includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the pothole detection system 110 may be communicatively coupled to nearby vehicles via the network 170. In some embodiments, the network 170 is a personal area network that utilizes Bluetooth technology to communicatively couple the pothole detection system 110 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the pothole detection system 110 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Components and functionality of the system 100 of FIG. 1 will now be described with reference to FIG. 2 which includes an illustrative schematic of the system for detecting a pothole in a road 200 deployed in a roadway environment. In embodiments, the system may be deployed along a road 200. The road 200 includes two lanes, a first lane 210 and a second lane 220. As depicted, for explanation purposes only, two pothole detection systems 110a and 110b (each corresponding to the pothole detection system 110 described above with respect to FIG. 1 and including the components of the pothole detection system 110 described above with respect to FIG. 1, but utilizing "a" and "b" designations after component numbers to differentiate between components of the two pothole detection systems 110a and 110b, respectively) are deployed in series along within the second lane 220 of the road 200. For example, as depicted, the first pothole detection system 110a includes conductive material 150a having three conductive paths. That is, a first conductive path extends from junction 222a to 224a, a second conductive path extends from junction 222b to 224b, and a third conductive path extends from junction 222c to 224c. Each of the junctions 222a, 222b, and 222c are electrically coupled to the first detection subsystem 111a. Additionally, each of the junctions 224a, 224b, and 224c are electrically coupled to the first detection subsystem 111a, such that an electrical signal generated by the signal generator 140 of the first detection subsystem 111a may propagate through one or more of the conduction paths of the conductive material 150a from the first set of junctions 222a, 222b, and 222c to the second set of junctions 224a, 224b, and 224c and back to the first detection subsystem 111a.

In some embodiments, the electronic control unit 130 of the first detection subsystem 111a may implement a multiplexer such that one or more of the conduction paths of the conductive material 150a may be selectively electrically coupled such that the electrical signal only propagates through the selected conduction path. In other embodiments, each of the junctions of the first set of junctions 222a, 222b, and 222c may be a common node and each of the junctions the second set of junctions 224a, 224b, and 224c may be a common node electrically coupled to the first detection subsystem 111a. The first detection subsystem 111a may also include network interface hardware 160a for transmitting and receiving information from a remote computing device 102.

In operation, for example, the first detection subsystem 111a generates an electrical signal that propagates through the conductive material 150a. The electrical signal returns to the first detection subsystem 111a if the conduction paths of the conductive material 150*a* are intact. That is, when a pothole forms in a road 200, holes of varying depths, sizes, and shapes may be formed within the road 200. During this process, the conductive material 150*a* is affected. For example, if the conduction material is a conductive paint applied to the surface of the road 200, where a pothole is formed the conductive paint may be damaged or removed along with road material. In an example where the conduction material is one or more wires or other material disposed within the surface course of the road 200, the formation of a pothole may break the one or more wires negatively effecting the ability of the conductive material 150*a* to conduct the electrical signal. In some instances, the break may cause an open circuit along one or more of the conduction paths of the conductive material 150*a*.

Figure 2:
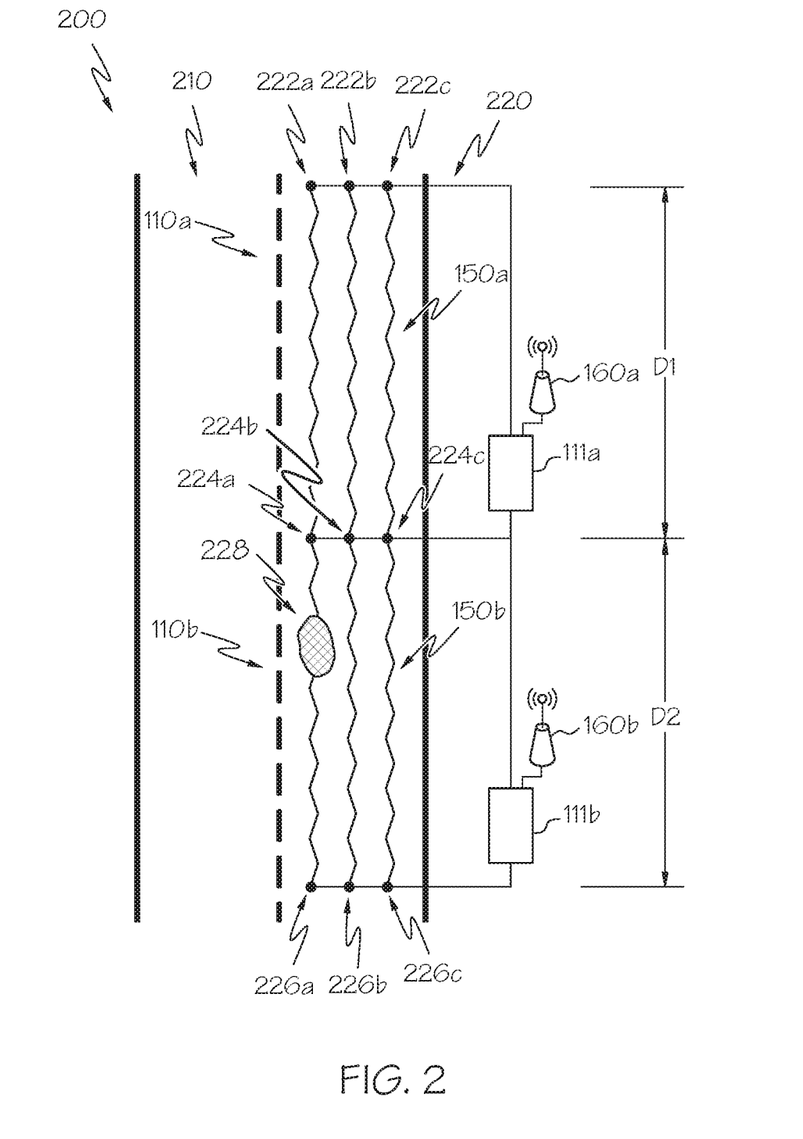
FIG. 2 depicts an illustrative schematic of a system for detecting a pothole in a road deployed in a roadway environment according to one or more embodiments shown and described herein.

In FIG. 2, the conductive material 150*a* configured along the segment D1 of the road 200 is depicted as being intact with no potholes. However, the conductive material 150*b* configured along the segment D2 of the road 200 is depicted as having a damaged conduction path as depicted by the presence of a pothole 228.

Turning to the second pothole detection system 110*b* depicted in FIG. 2, the second pothole detection system 110*b* includes conductive material 150*b* having three conductive paths. That is, a fourth conductive path extends from junction 224*a* to 226*a*, a fifth conductive path extends from junction 224*b* to 226*b*, and a sixth conductive path extends from junction 224*c* to 226*c*. Each of the junctions 224*a*, 224*b*, and 224*c* are electrically coupled to the detection subsystem 111*b*. Additionally, each of the junctions 226*a*, 226*b*, and 226*c* are electrically coupled to the detection subsystem 111*b*, such that an electrical signal generated by the signal generator 140 of the detection subsystem 111*b* may propagate through one or more of the conduction paths of the conductive material 150*b* from the first set of junctions 224*a*, 224*b*, and 224*c* to the second set of junctions 226*a*, 226*b*, and 226*c* and back to the detection subsystem 111*b*.

In some embodiments, the electronic control unit 130 of the detection subsystem 111*b* may implement a multiplexer such that one or more of the conduction paths of the conductive material 150*b* may be selectively electrically coupled such that the electrical signal only propagates through the selected conduction path. In other embodiments, each of the junctions of the first set of junctions 224*a*, 224*b*, and 224*c* may be a common node and each of the junctions the second set of junctions 226*a*, 226*b*, and 226*c* may be a common node electrically coupled to the detection subsystem 111*b*. The detection subsystem 111*b* may also include network interface hardware 160*b* for transmitting and receiving information from a remote computing device 102.

The pothole 228 interrupts the conduction path of the conductive material 150*b* that extends between junction 224*a* and junction 226*a*. The second detection subsystem 111*b* may detect the presence of the pothole 228 in a variety of ways. In one embodiment, the signal generator 140 of the second detection subsystem 111*b* may generate and transmit an electrical signal along the conduction path of the conductive material 150*b* extending between junction 224*a* and junction 226*a*. The electronic control unit 130 of the second detection subsystem 111*b* determines whether the electrical signal propagates through the conduction path of the conductive material 150*b* between junction 224*a* and junction 226*a*. However, in the present instance a pothole 228 prevents conduction of the electrical signal through the conduction path of the conductive material 150*b* between junction 224*a* and junction 226*a*. Thus, in response to determining that the electrical signal does not propagate through the conductive material 150*b* through the conduction path of the conductive material 150*b* between junction 224*a* and junction 226*a* the electronic control unit 130 determines a pothole 228 is present in the road 200 at a location between junction 224*a* and junction 226*a*. The electronic control unit 130, in response to determining the presence of a pothole 228 in the road 200, may transmit a notification to a remote computing device 102. The notification may include information such as a location of the pothole 228 based on the location between junction 224*a* and junction 226*a* and/or the location of the second detection subsystem 111*b*.

In some embodiments, the second detection subsystem 111*b* may detect the presence of the pothole 228 by determining a change in the resistance of the conductive material 150*b* from a previous known resistance value and/or that the resistance of the conductive material 150*b* is above a predetermined resistance threshold. For example, as depicted the conductive material 150*b* includes three conductive paths (e.g., the fourth, fifth, and sixth conductive paths as previously defined). Each of the conductive paths may have a predefined resistance and when configured in parallel the conductive material 150*b* has a measureable and predefined resistance. When one or more conductive paths are broken by the presence of a pothole 228, the resistance of the conductive material 150*b* changes. The change in resistance is detected by the electronic control unit 130 and the presence of a pothole 228 is determined. The change may be an increase or decrease in resistance.

In some embodiments, the electronic control unit 130 of the second detection subsystem 111*b* may selectively electrically couple to one or more of the conductive paths of the conductive material 150*b*, for example, using a multiplexer or similar device to monitor the resistance of the conductive path independently of other conduction paths.

The electronic control unit 130 may monitor the conductive material 150*a* and/or 150*b* using an analog-to-digital A/D input. In some embodiments, the electronic control unit 130 may monitor the signal generated by the signal generator 140 and the electrical signal propagating through the conductive material 150*a* and/or 150*b*. The electronic control unit 130 may compare the two signals and determine whether the modulated electrical signal (i.e., the electrical signal generated by the signal generator 140 having predetermined characteristics) is analogous to characteristics of an electrical signal received by the electronic control unit 130 from the conductive material 150*a* and/or 150*b*. A difference in amplitude, frequency, period, and/or waveform shape may indicate that the conductive material 150*a* and/or 150*b* has been negatively affected by the presence of a pothole 228 and thus the electronic control unit 130 may detect the difference and determine the presence of a pothole 228 based on the difference.

Figure 3:
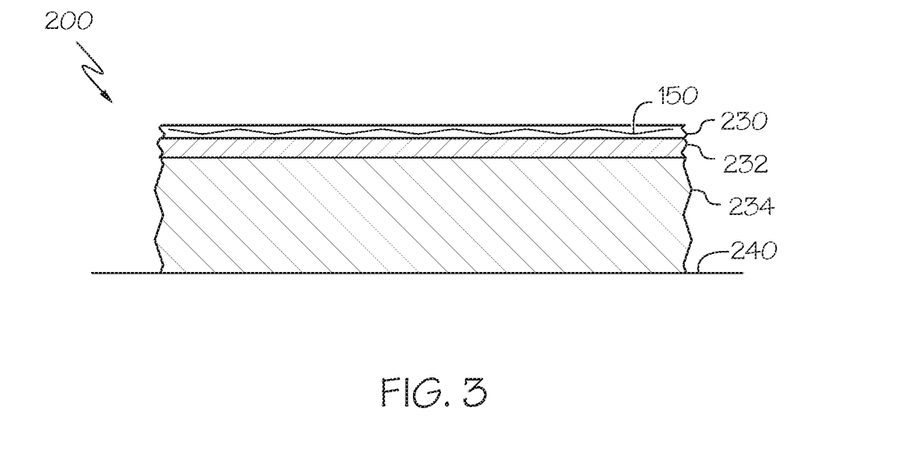
FIG. 3 depicts an illustrative cross-section of a roadway having a conductive material of a pothole detection system integrated therein according to one or more embodiments shown and described herein.
Figure 4:
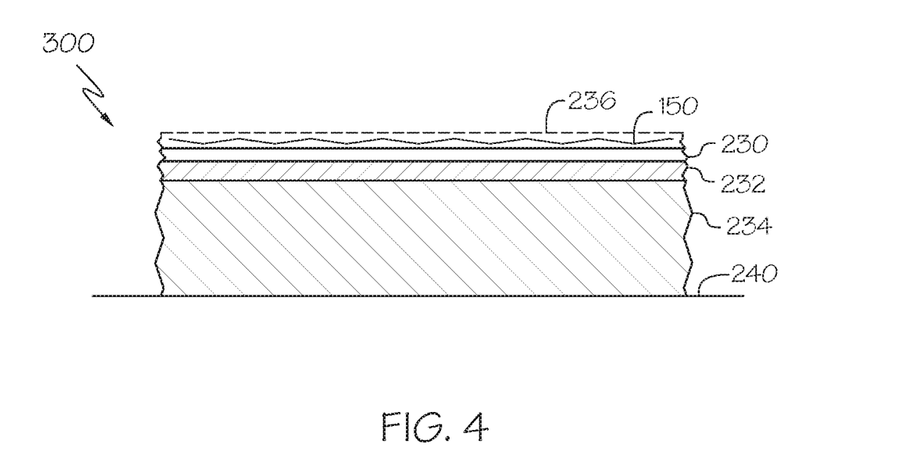
FIG. 4 depicts an illustrative cross-section of a roadway having a conductive material of a pothole detection system deployed on the surface of the road according to one or more embodiments shown and described herein.

It should be understood that the deployment of the pothole detection system 110 in a road environment may operate as described herein regardless of the how the conductive material 150*a* and 150*b* is deployed along a segment of road 200. Turning to FIGS. 3 and 4, illustrative cross-sections of a roadway having a conductive material 150 of a pothole detection system 110 is depicted in two example and non-limiting configurations. FIG. 3 depicts an illustrative cross-section of a road 200 having a conductive material 150 of a pothole detection system 110 integrated therein. FIG. 4 depicts an illustrative cross-section of a road 300 having a conductive material 150 of a pothole detection system 110 deployed on the surface of the road. Roads 200 and 300 are generally constructed having a defined structure that includes a surface course 230, a base course 232, and a subbase course 234 built within and/or on the natural terrain 240. Each of the courses 230, 232, and 234 has varying dimensions and materials depending on the environment and structural demands for the road 200 and 300. Potholes generally form within surface course 230. Therefore, the pothole detection system 110 may be configured to monitor this course for the presence of a pothole. Referring to FIG. 3, the conductive material 150 of the pothole detection system 110 may be wires or other materials inlayed with the surface course 230. In some embodiments, the conductive material 150 may be installed when the road 200 is being built or repaved such that the conductive material 150 may be disposed within the surface course 230.

Referring now to FIG. 4, in some embodiments, the conductive material 150 may be deployed on the surface of the road 300. For example, the conductive material 150 may be suspended and adhered to the surface of the road 300 through an adhesive medium 236. For example, the adhesive medium 236 may be a conductive paint applied to the surface of the road. For example, the conductive paint may define the lane lines of the road 300 or may be a sealer covering predefined portions of the road surface. These are only a few examples of how conductive material 150 may be applied to the surface of a road 300. Other methods of attaching a conductive material 150 to the surface of a road 300 may be implemented without deviating from the scope of the present disclosure.

Figure 5:
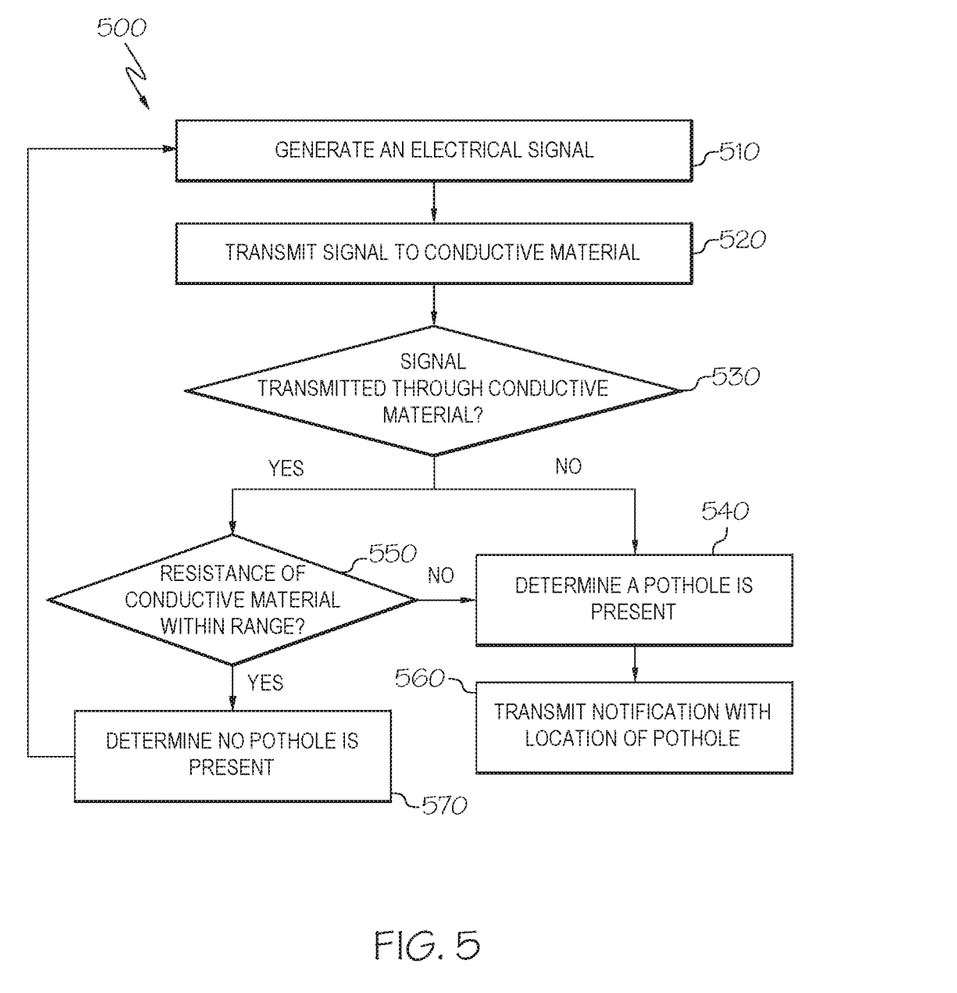
FIG. 5 depicts a flow diagram of an illustrative method for detecting a pothole in a road according to one or more embodiments shown and described herein.

FIG. 5 depicts a flow diagram 500 of an illustrative method for detecting a pothole 228 in a road 200. The method may be implemented by the electronic control unit 130 and/or various components of the pothole detection system 110. At block 510, the signal generator 140 generates an electrical signal for transmitting to the conductive material 150. The signal generator 140 may be predefined to generate an electrical signal with predetermined characteristics, such as a constant DC voltage. In some embodiments, the electronic control unit 130 may control the signal generator 140 such that the signal generator 140 generates an electronic signal with characteristics such as a voltage, a frequency, a period, a waveform shape or the like.

At block 520, the electrical signal generated by the signal generator 140 is transmitted to the conductive material 150. The electrical signal maybe transmitted to the conductive material 150 by way of a communication path 120 or other conductive means. At block 530, the electronic control unit 130 monitors the conductive material 150 to determine whether the electrical signal induced into the conductive material 150 by the signal generator 140 is propagating through the conductive material 150. In the event the electronic control unit 130 determines that the electrical signal is not propagating through the conductive material 150 ("NO" at block 530), the electronic control unit 130, at block 540, determines that a pothole 228 is present. In some embodiments, when a pothole 228 is determined to be present at block 540, the electronic control unit 130 at block 560 may transmit a notification to a remote computing device 102 with information indicating the presence of a pothole 228 and/or the location of the pothole 228. This may subsequently trigger a work order to be generated for repairing the pothole 228.

In embodiments, at block 530, when the electronic control unit 130 determines that the electrical signal is propagating through the conductive material 150 ("YES" at block 530), the electronic control unit 130 may determine that a pothole 228 is not present and continue monitoring electrical signals from the conductive material 150. However, in some embodiments, at block 530, when the electronic control unit 130 determines that the electrical signal is propagating through the conductive material 150 ("YES" at block 530), the electronic control unit 130 may, at block 550, determine a resistance value of the conductive material 150 and/or other characteristics of the electrical signal propagating through the conductive material 150. If a determined resistance value is determined to not be within a predetermined acceptable range or is determined to be above a predetermined resistance threshold ("NO" at block 550), then the electronic control unit 130, at block 540, determines that a pothole 228 is present at a location along the segment of road 200 comprising the conductive material. In instances when the determined resistance value is determined to be within a predetermined acceptable range or is determined to be below a predetermined resistance threshold ("YES" at block 550), then the electronic control unit 130, at block 570, determines that a pothole 228 is not present. In such an instance, the electronic control unit 130 continues monitoring the electrical signals propagating through the conductive material 150.

Although block 550 is described with respect to determining whether a resistance value is within a predetermined range, the electronic control unit 130 may be configured to compare characteristics of a modulated electrical signal generated by the signal generator 140 (i.e., an electrical signal other than a constant DV voltage), with characteristics of the electrical signal received from the conductive material 150. The comparison allows the electronic control unit 130 to determine whether the conductive material 150 has altered the modulated electrical signal because a pothole 228 is present. For example, added noise, attenuation in the signal, an intermittent signal, or the like may indicate stresses to the conductive material 150 caused by the presence of a pothole 228.

In some embodiments, the electrical signal generated by the signal generator 140 is a predetermined DC voltage. In such instances, the electronic control unit 130 may determine whether the electrical signal generated by the signal generator is propagating through the conductive material 150 by comparing a value of the predetermined DC voltage with a value of a voltage received from the conductive material 150.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments described herein include technology that intelligently detects potholes in road surfaces utilizing sensing equipment installed in the road. The technology allows the road to detect defects such as potholes within itself and upload the information to a tracking system where repairs may be coordinated. In some embodiments, the detection system may upload information regarding the road for use in roadway material and/or structure analysis.

For example, the systems and methods may include a conductive material configured along a segment of a road, a signal generator electrically coupled to the conductive material, where the signal generator is configured to generate an electrical signal for transmission across the conductive material and an electronic control unit communicatively coupled to the signal generator and the conductive material. The electronic control unit is configured to determine whether the electrical signal from the signal generator propagates through the conductive material and in response to determining that the electrical signal does not propagate through the conductive material, determine that a pothole is present at a location along the segment of road comprising the conductive material.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a conductive wire material configured within a segment of a surface course of a road;
   a signal generator electrically coupled to the conductive wire material, wherein the signal generator is configured to generate a predetermined modulated electrical signal having a predetermined frequency for transmission across the conductive wire material; and
   an electronic control unit communicatively coupled to the signal generator and the conductive wire material, and configured to:
      determine whether the predetermined frequency of the predetermined modulated electrical signal generated by the signal generator is different from a frequency of an electrical signal received by the electronic control unit after propagating through the conductive wire material, and
      in response to determining that the frequency of the electrical signal received by the electronic control unit after propagating through the conductive wire is different from the predetermined frequency, determine that a pothole is present at a location along the segment of the road comprising the conductive wire material.

2. The system of claim 1, wherein the electronic control unit is further configured to:
   in response to determining that the predetermined modulated electrical signal is propagating through the conductive wire material, determine a resistance of the conductive wire material;
   determine whether the resistance of the conductive wire material is above a predetermined resistance threshold; and
   in response to determining that the resistance of the conductive wire material is above the predetermined resistance threshold, determine that the pothole is present at the location along the segment of the road comprising the conductive wire material.

3. The system of claim 1, wherein the electronic control unit is further configured to:
   transmit a notification to a remote computing device, wherein the notification indicates the presence of the pothole along the segment of the road comprising the conductive wire material.

4. The system of claim 1, wherein the predetermined modulated electrical signal generated by the signal generator includes a predetermined DC voltage.

5. The system of claim 4, wherein the electronic control unit determines whether the predetermined modulated electrical signal generated by the signal generator is propagating through the conductive wire material by comparing a value of the predetermined DC voltage with a value of a voltage received from the conductive wire material.

6. The system of claim 1, wherein the conductive wire material configured along the segment of the road comprises a plurality of conductive paths and the electronic control unit is configured to electrically couple to one or more of the plurality of conductive paths using a multiplexer.

7. The system of claim 1, further comprising a conductive paint applied to a surface of the road.

8. The system of claim 1, wherein the conductive wire material includes a plurality of wires configured within the segment of the surface course of the road.

9. A method comprising:
   generating a predetermined modulated electrical signal having a predetermined frequency with a signal generator;
   transmitting the predetermined modulated electrical signal to a conductive wire material configured along a segment of a road;
   determining, with an electronic control unit, whether the predetermined frequency of the predetermined modulated electrical signal generated by the signal generator is different from a frequency of an electrical signal received by the electronic control unit after propagating through the conductive wire material; and
   in response to determining that the frequency of the electrical signal received by the electronic control unit after propagating through the conductive wire is different from the predetermined frequency, determining that a pothole is present at a location along the segment of the road comprising the conductive wire material.

10. The method of claim 9, further comprising:
    in response to determining that the predetermined modulated electrical signal is propagating through the conductive wire material, determining a resistance of the conductive wire material;
    determining whether the resistance of the conductive wire material is above a predetermined resistance threshold; and in response to determining that the resistance of the conductive wire material is above the predetermined resistance threshold, determining that the pothole is present at the location along the segment of the road comprising the conductive wire material.

11. The method of claim 9, further comprising:
transmitting a notification to a remote computing device, wherein the notification indicates the presence of the pothole along the segment of the road comprising the conductive wire material.

12. The method of claim 9, wherein the predetermined modulated electrical signal generated by the signal generator includes a predetermined DC voltage.

13. The method of claim 12, wherein determining whether the predetermined modulated electrical signal generated by the signal generator is propagating through the conductive wire material includes comparing a value of the predetermined DC voltage with a value of a voltage received from the conductive wire material.

14. The method of claim 9, wherein the conductive wire material configured within the segment of the surface course of the road comprises a plurality of conductive paths and the electronic control unit is configured to electrically couple to one or more of the plurality of conductive paths using a multiplexer.

15. The method of claim 9, further comprising applying a conductive paint to a surface of the road.

16. A system comprising:
a conductive wire material configured within a segment of a surface course of a road;
a signal generator electrically coupled to the conductive wire material, wherein the signal generator is configured to generate a predetermined modulated electrical signal having a predetermined frequency, predetermined period, and predetermined waveform shape for transmission across the conductive wire material; and
an electronic control unit communicatively coupled to the signal generator and the conductive wire material, wherein the electronic control unit is configured to:
determine whether the predetermined modulated electrical signal generated by the signal generator is propagating through the conductive wire material, in response to determining that a frequency of an electrical signal received by the electronic control unit after propagating through the conductive wire is different from the predetermined frequency, determine that a pothole is present at a location along the segment of the road comprising the conductive wire material;
in response to determining that the predetermined modulated electrical signal is propagating through the conductive wire material, determine a characteristic of the electrical signal that propagated through the conductive wire material, wherein the characteristic includes at least one of a frequency, a period, or a waveform shape;
compare the characteristic of the electrical signal that propagated through the conductive wire material with a corresponding characteristic of the predetermined modulated electrical signal generated by the signal generator; and
determine the presence of the pothole based on the comparison of the characteristic of the electrical signal that propagated through the conductive wire material and the corresponding characteristic of the predetermined modulated electrical signal generated by the signal generator.

* * * * *